US012744772B2

(12) United States Patent
Mao et al.

(10) Patent No.: US 12,744,772 B2
(45) Date of Patent: Sep. 22, 2026

(54) MANAGED POLICY FOR INTERNAL STAGE NETWORK POLICY

(71) Applicant: Snowflake Inc., Bozeman, MT (US)

(72) Inventors: Zhoujia Mao, Newark, CA (US); Frantisek Rolinek, Seattle, WA (US); Prasoon Shukla, Sunnyvale, CA (US); Ramana Rao S. Turlapati, Newark, CA (US)

(73) Assignee: Snowflake Inc., Bozeman, MT (US)

(*) Notice: Subject to any disclaimer, the term of this patent is extended or adjusted under 35 U.S.C. 154(b) by 43 days.

(21) Appl. No.: 18/893,804

(22) Filed: Sep. 23, 2024

(65) Prior Publication Data

US 2026/0089152 A1 Mar. 26, 2026

(51) Int. Cl.
*G06F 21/57* (2013.01)
*H04L 9/40* (2022.01)

(52) U.S. Cl.
CPC .................................. *H04L 63/083* (2013.01)

(58) Field of Classification Search
None
See application file for complete search history.

(56) References Cited

U.S. PATENT DOCUMENTS

2010/0332641 A1* 12/2010 Shanmugasundaram .................... G06F 21/554 709/224
2022/0318416 A1* 10/2022 Olden .................. G06F 21/604
2023/0403279 A1* 12/2023 Gnanaprakasam ... H04L 63/126
2025/0247434 A1* 7/2025 Bansal ................ H04L 41/5048

* cited by examiner

*Primary Examiner* — Fatoumata Traore
(74) *Attorney, Agent, or Firm* — Schwegman Lundberg & Woessner, P.A.

(57) ABSTRACT

Aspects of the present disclosure relate to configuring managed policy for internal stage network policy. More specifically, a method of the present disclosure includes generating and activating a set of network policies on a control plane of a service provider. The method includes determining to convert the set of network policies activated on the control plane of the service provider into an IAM policy at the service provider. The method includes utilizing at least one of the converted IAM policies of an active network policy in response to a creation of a presigned URL. The method includes determining whether an STS token is approved based on the presigned URL and at least one of the set of network policies or the IAM policy. The method includes utilizing an approved STS token to access the service provider.

14 Claims, 8 Drawing Sheets

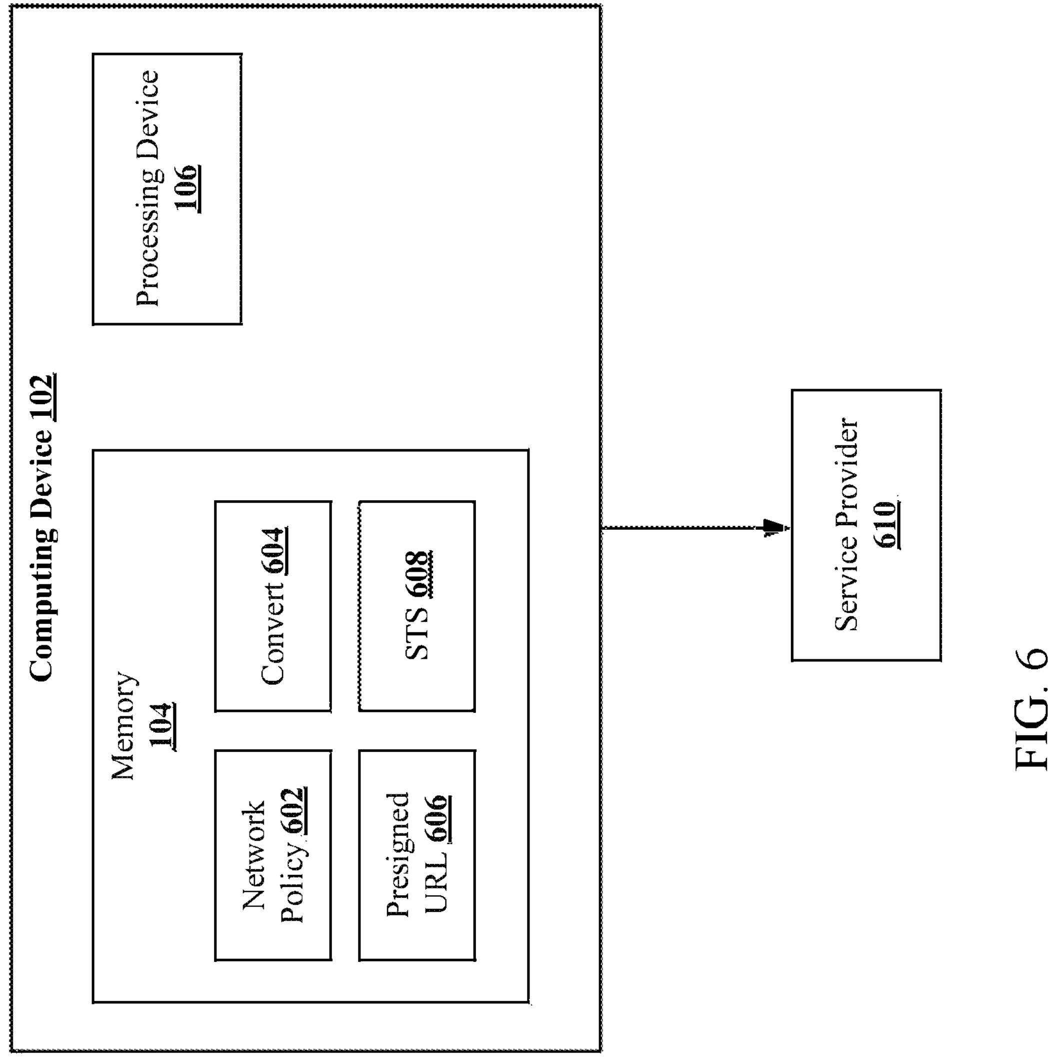
Computing Device 102
Processing Device 106
Memory 104
Convert 604
STS 608
Network Policy 602
Presigned URL 606
Service Provider 610
FIG. 6
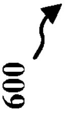
600

MANAGED POLICY FOR INTERNAL STAGE NETWORK POLICY

TECHNICAL FIELD

Aspects of the present disclosure relate to network policies, and more particularly, to configuring managed policies for internal stage network policies.

BACKGROUND

An internal stage volume credential may be provided in different manners. In a first example, a presigned uniform resource locator (URL) may be utilized to access an internal stage. For example, a query with a large result set may store portions or chunks in an internal stage and generates a presigned URL for a client to download, or file functions or internal functions may be configured to specifically generate presigned URL for access to internal stage files. In a second example, file stage structured query language (SQL) or internal functions may be configured to generate location information of a stage. In a third example, extension functions that create or refresh scope credentials of a stage volume may be used as a temporary read-only volume path in a stage volume. In such instances, the first and second examples, use network policy for generating subscope credentials, and may also utilize scoped credentials when subscoping the credential to reduce calls to the security token service (STS).

BRIEF DESCRIPTION OF THE DRAWINGS

The described aspects and the advantages thereof may best be understood by reference to the following description taken in conjunction with the accompanying drawings. These drawings in no way limit any changes in form and detail that may be made to the described aspects by one skilled in the art without departing from the spirit and scope of the described aspects.

FIG. 6 is a block diagram that illustrates an example system in accordance with some aspects of the present disclosure.

DETAILED DESCRIPTION

Figure 1:
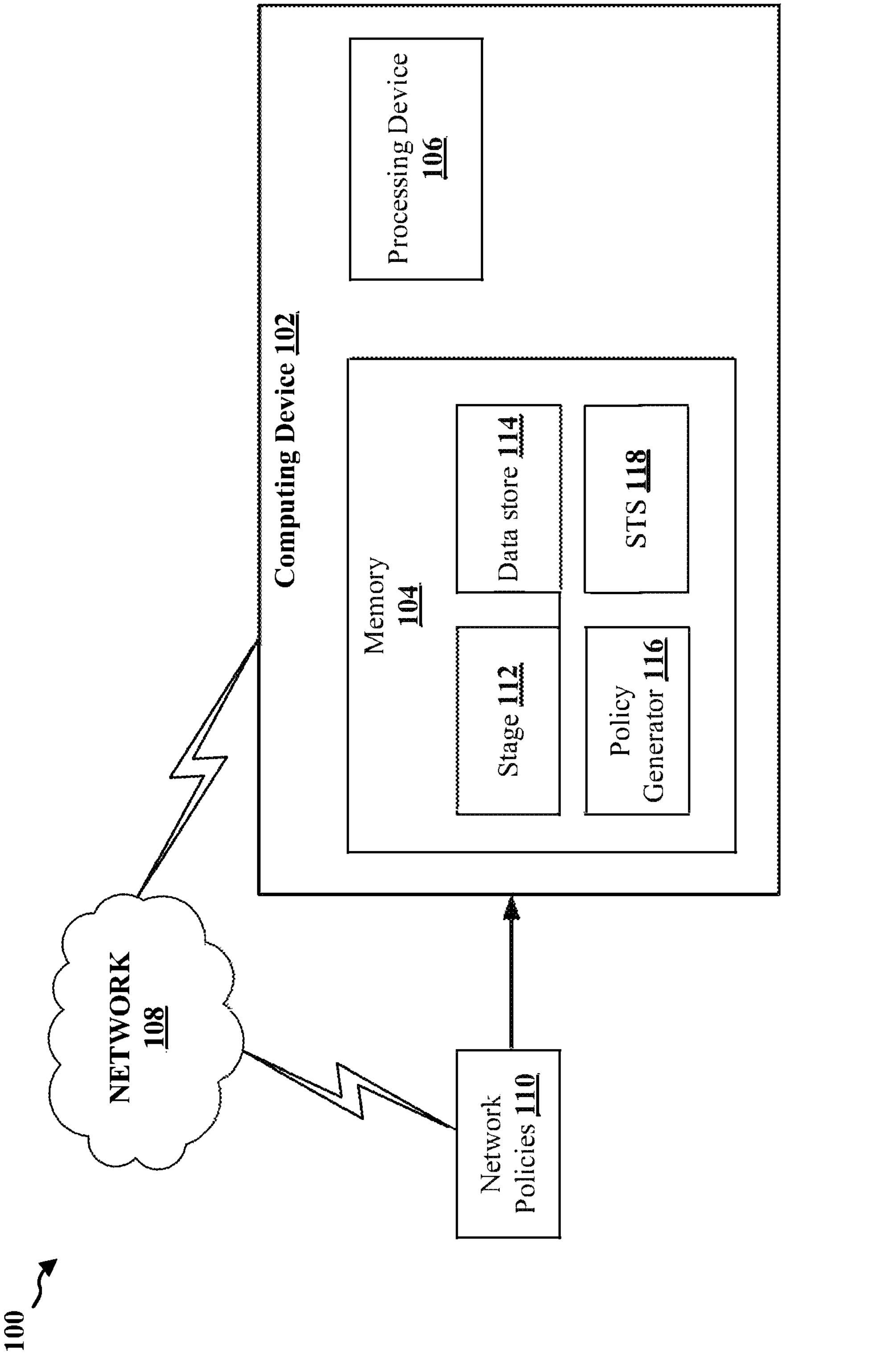
FIG. 1 is a block diagram that illustrates an example system in accordance with some aspects of the present disclosure.

A generated presigned uniform resource locator (URL) may be utilized to access and put/get files to/from internal stages (e.g., cloud service provider (CSP) blob storage). In some instances, a large result set query may store results in internal stages for client drivers to download. In some instances, a presigned URL file function may be utilized to generate a URL to share stage files, while in other instances, files may be placed/retrieved to and from stages. Internal stage network policy is used to restrict access to internal stages based on an internet protocol (IP) or a private link identifier (ID). A check occurs on an internal stage (e.g., CSP side) and defined network policies (e.g., created beforehand) are converted to identity and access management (IAM) policy and are provided to the CSP when attached to users or accounts (e.g., activation time). The references of IAM managed policies are included in the session policy when the presigned URL is generated and scoped. The policies are then enforced by CSP when the presigned URL is used to access the stage. This process is known as "subscope" that generates an access token which is used in generating a presigned URL for stage access.

In some instances, content of a network policy is directly included in an IAM inline session policy in subscope, but such instances may result in a session policy size exceeding a size limit because the session policy is inline and needs to be compressed. Inclusion of all possible virtual private cloud endpoint (VPCE) IDs and IPs into a single inline session policy may be difficult while not being able to exceed a character limit (e.g., 2048 characters). In addition, compression of the inline policy may violate a compression size per session token.

The present disclosure addresses the above-noted and other deficiencies by using a processing device to convert managed policies for internal stage network policy. In an example, a processing device generates, at a computing device, a set of network policies on a control plane of a service provider of the customer account. The processing device determines to activate one of the network policies and convert it to IAM managed policies at the CSP generated on the control plane of the service provider into an IAM policy at the service provider. The processing device includes all references of the IAM managed policies at the CSP converted from the active network policy into a presigned URL token. The processing device decodes the token and uses the referred IAM managed policies to evaluate the access based on the presigned URL and at least one of the set of network policies or the IAM policy. The processing device utilizes an approved STS token to access the service provider. Vis-à-vis generating a set of network policies, determining to convert the set of network policies into an IAM policy, utilizing at least one of the set of network policies or the IAM policy in response to a creation of a presigned URL, determining whether a STS token is approved, and utilizing an approved STS token to access the service provider, the processing device may facilitate the conversion of managed policies for internal stage network policy.

The disclosure may provide for a conversion of network policy to IAM managed policies in instances where a network policy is newly attached to a user or account and updates the corresponding IAM managed policies when the network policy content is updated. In some instances, in the data plane (e.g., subscope), reference numbers of pre-created managed policies are attached into an inline IAM session policy when generating an access token. The disclosure is able to support increased character size policy documents without compression, which is an improvement over the compression limit (e.g., 2 k character limit, 450 bytes) of the inline session policy. In addition, the conversion of the network policy to the IAM policy documents is moved from the data plane to the network policy control plane. The data plane may be involved in large result set query and various storage application programming interfaces (APIs) which include a much higher queries per second (QPS), even with cache, in comparison to network policy attachments and updated control plane API QPS. As such, the load of overall calls to a cloud provider's token generation (e.g., STS token APIs) is also reduced.

The disclosure may include a first type ingress mode network rule (e.g., IPv4 type) or IP range in an allowed IP list that contains a current session client IP, and VPCE IDs may include all session client IP from associated internal stage mode networks. In some instances, ingress and internal stage can have different client IP such that a file function (e.g., get_presigned_url) may be utilized where the URL can be shared to third parties. In some instances, the network policies may include a list of IPs and private link ID.

FIG. 1 is a block diagram that illustrates an example system 100 in accordance with some aspects of the present disclosure. The system may include a computing device 102, memory 104, processing device 106, network 108, and network policies 110. The computing device 102 may include hardware such as processing device 106 (e.g., processors, central processing units (CPUs)) and memory 104 (e.g., random access memory (RAM), hard-disk drive (HDD), persistent storage) as well as other hardware devices (e.g., network interfaces, sound card, video card, etc.—not shown). A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The processing device 106 may be operatively coupled to the memory 104.

The computing device 102 may communicate with other devices via a network 108. The network may be a public network (e.g., the internet), a private network (e.g., a local area network (LAN) or wide area network (WAN)), or a combination thereof. In one example, the network may include a wired or a wireless infrastructure, which may be provided by one or more wireless communications systems, such as a WiFi™ hotspot connected with the network and/or a wireless carrier system that can be implemented using various data processing equipment, communication towers (e.g., cell towers), etc. The network 108 may carry communications (e.g., data, message, packets, frames, etc.) between the computing device 102 and the other devices. The computing device 102 may also include one or more sensors (e.g., temperature sensors, moisture sensors, etc.—not shown).

In some aspects, the computing device 102 may comprise any suitable type of computing device or machine that has a programmable processor (e.g., processing device 106) including, for example, server computers, desktop computers, laptop computers, tablet computers, smartphones, set-top boxes, etc. In some examples, the computing device 102 may include a single machine or may include multiple interconnected machines (e.g., multiple servers configured in a cluster). The computing device 102 may be implemented by a common entity/organization or may be implemented by different entities/organizations. The computing device 102 may execute or include an operating system (OS). The OS may manage the execution of other components (e.g., software, applications, etc.) and/or may manage access to the hardware (e.g., processors, memory, storage devices etc.) of a device in the computing device 102.

The computing device 102 may further include a stage 112, a data store 114, a policy generator 116, and a STS 118. In some instances, the computing device 102 may obtain active network policies from the network policy 110. The computing device may attach network policies to users or accounts, may alter attached network policies, or may alter attached network rules, and may be provided to the stage 112. The data store 114 may include allowed or blocked IPs of VPCE IDs. In instances where network rules for internal stages is enabled, a client IP may be used to only find a first matched ingress mode network rule and obtain all VPCE IDs. In instances where network policy for internal stages is enabled, a session client IP may be used to find a first matched IP range from the allowed or blocked IP list.

The policy generator 116 may convert network policy credentials to a single inline session policy. The STS 118 may provide a token (e.g., federation token) to allow access for the client.

Figure 2:
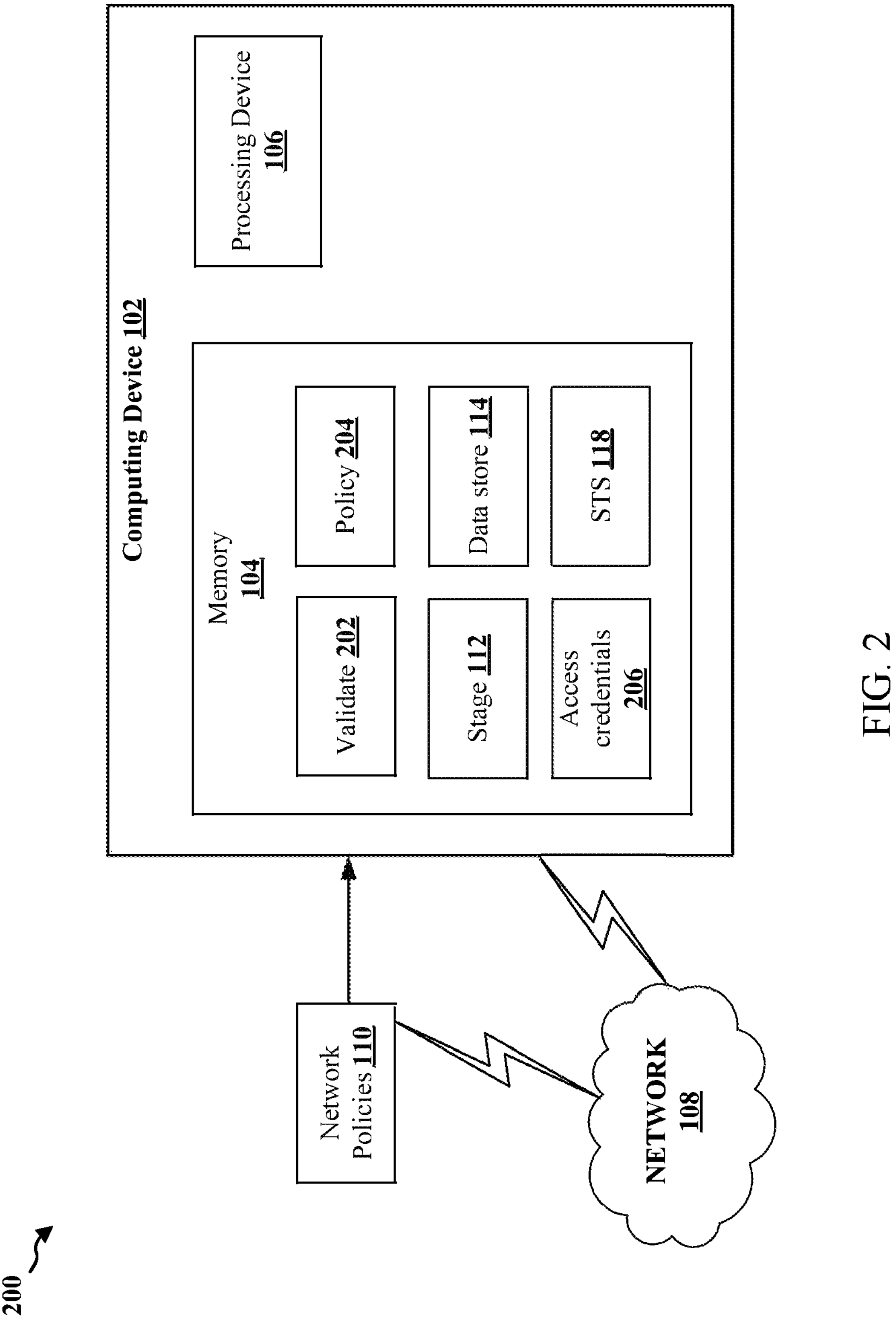
FIG. 2 is a block diagram that illustrates another example system in accordance with some aspects of the present disclosure.

FIG. 2 is a block diagram that illustrates an example system 200 in accordance with some aspects of the present disclosure. The system may include a computing device 102, memory 104, processing device 106, network 108, and network policies 110. The system 200 may be configured in a manner similar to system 100, such that a discussion of similar components and/or configurations are not included to reduce duplication. The computing device 102 may further include a validate 202, a policy 204 and access credentials 206.

The computing device 102, in response to receiving network policies from network policies 110, may attach network policies to users or accounts, alter attached network policies on allowed or blocked ingress mode IP types or internal stage mode types, may set/add/remove network rules or IP list set of the attached network policies on the allowed/blocked value list, detach network policies from users or accounts, utilize system functions to synchronize network policies to managed policies, or replicate network policies.

In some aspects, the computing device may convert one or more attached policies to managed policies. In instances of a network rule value update, there can be multiple network policies containing that network rule and are attached to users and/or the account. Validate 202 may validate the managed policy document within the same transaction of network policy operation, so that the network policy related data persistent objects (DPOs) committed to a forward database (FDB) is consistent with what has been validated. Policy 204 may be configured to create or delete policies or may be configured to create or delete policy versions. The computing device may commit policy or policy versions to users and or accounts.

Figure 3:
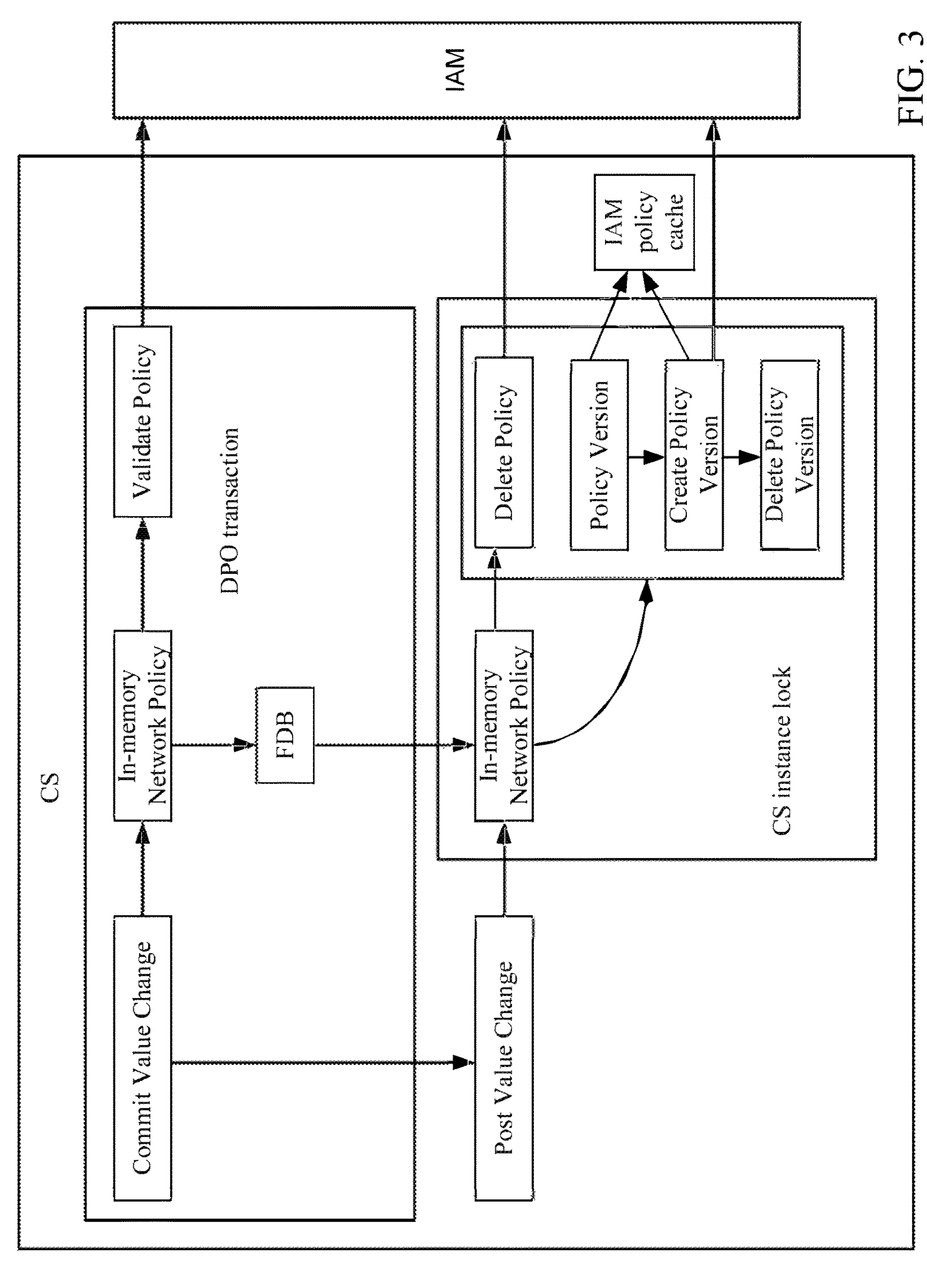
FIG. 3 is a block diagram that illustrates an example of a commit phase in accordance with some aspects of the present disclosure.

In some aspects, after the committing, a hold collection of services (CS) instance lock may occur on the network policy across both the CS instances and locally within a CS instance, as shown for example in diagram 300 of FIG. 3. The CS may be configured as a collection of services that process user requests, including login, metadata management, query parsing/optimization, and query coordination/dispatch services. In some aspects, up-to-date network policy related data from a FDB may be read and converted to a policy document. The request may be determined to comprise a create or an update request based on the versions read from network policy. In some instances, a drop case may be determined based on the up-to-date attachment and a DPO delete field. In instances of the update case, cache is read first to compare the to-be-updated content with the current document content. If there are no changes, the new versions are not created, then update IAM policy, and once successful, immediately delete the old version. After operations to IAM returns successfully, versions are committed to FDB (e.g., NetworkPolicyDPO) and release CS instance lock.

In some aspects, a write to IAM occurs after the data is committed. Current code may not be able to hold CS instance lock for the entire DPO transaction, as such FDB may be utilized as a source of truth. In some aspects, FDB may be read for up-to-date data instead of using in memory data prepared in the commit stage. For example, a first thread may be committed and a second thread may be committed afterwards, but the second thread may get the CS instance lock and writes the policy document, while the first thread subsequently overwrites the document with old data. As such, up-to-date FDB data is used while holding the CS instance lock.

Within CS lock, after IAM operation returns successfully, the network policy DPO is updated with the versions and count. In some aspects, if the process fails, the process gets logged and throws an exception to client, such that the client is aware of the failed part and the network policy will not be effective/ineffective in the session policy.

The managed policy version and the number of mapped managed policies may be stored in the DPO. In some aspects, without storing the version, a call to an IAM policy check may occur to check for the current version every time before creating, updating or deleting managed policies. In some aspects, such as in instances where a network policy is mapped to multiple managed policies, the number of constructing reference numbers in data path may be known. In some aspects, FDB should be the source of truth over IAM for network policy to managed policy synchronization or to correct an inconsistency. Inconsistencies can be rare but possible because failures can happen in between client and server.

To convert a network policy to IAM managed policies, the computing device 102 may combine and deduplicate allowed and blocked public and private IPs, IP ranges, and VPCE IDs. A deny statement may be used for both allow and block lists, such that one managed policy can be used to convert one network policy, and the size limit may include 6 k. In some aspects, the size limit may be greater or less that 6 k, such that the disclosure is not intended to be limited to the aspects disclosed herein. In some aspects, instead of converting both allow and block lists with a deny statement as in inline session policy, a straightforward way of mapping the allow list may be utilized by using an allow statement and a block list with a deny statement. In some aspects, a set of policies (e.g., 10 managed policies) may be limited to comprise 10 resource names in a session policy when generating an STS token, which may be used to convert one network policy and have a size limit of 6 k×10.

In some aspects, the same resource and action may be utilized as in existing session policy and manual bucket policy, and in the data path, change the remaining inline allow statement (restricting the action and resource based on the storage use cases) to deny statement. A data store (DS) account user principal may be used as a managed policy name, and use the username as path (e.g., ease of list policies with path prefix), where the DS account is a CSP storage account managed for customers.

In some aspects, a CS principal is granted having corresponding IAM permissions in order to operate on IAM APIs. The IAM policies may grant the CS principal "CS principal policies". These policies are attached to the CS principal that allows CS code to create managed IAM policies. The resources of CS principal policies are customer managed IAM policies. The managed policies that one customer may create under its IAM user name may be limited. In this case, each customer session can only convert the customer account's network policies to managed policies under its own namespace, without impacting managed policies under namespaces of other customers, or the global namespace IAM policies.

In some aspects, the managed IAM policies created through CS code may be known as "customer managed policies". When these policies are converted from network policies, they are not yet effective, and is therefore a pure control plane. The resources of the "customer managed policies" are located under customer's base location, and the conditions contain the IPs or/and VPCE IDs access control lists (ACLs) from the network policy. In some aspects, when the presigned URLs or STS tokens are generated for the customer internal stage access use cases happens, the reference numbers of the generated "customer managed policies" will be referenced into the STS token and then the presigned URLs, this is then a data plane flow. The URL or stage credentials are then used by customers to access their isolated locations under the DS account bucket, and at that time, the "customer managed policies" will be applied.

In some aspects, the "customer managed policies" (discussed above) are sitting there without any attachment, and is only used in the STS token generation. In some aspects, other customers (e.g., internal clients) may also need to generate presigned URLs by reusing the same code path of customer's presigned URL generation code path. In such instances, internal client IPs may be separate from "customer managed policies" because it is a pure reflection of customer's network policies. In some aspects, such as when internal clients directly need access to the bucket (e.g., without volume subscope and complete different code path), it will not be impacted by "customer managed policies" because as they are only applied in the STS token generation.

Figure 4:
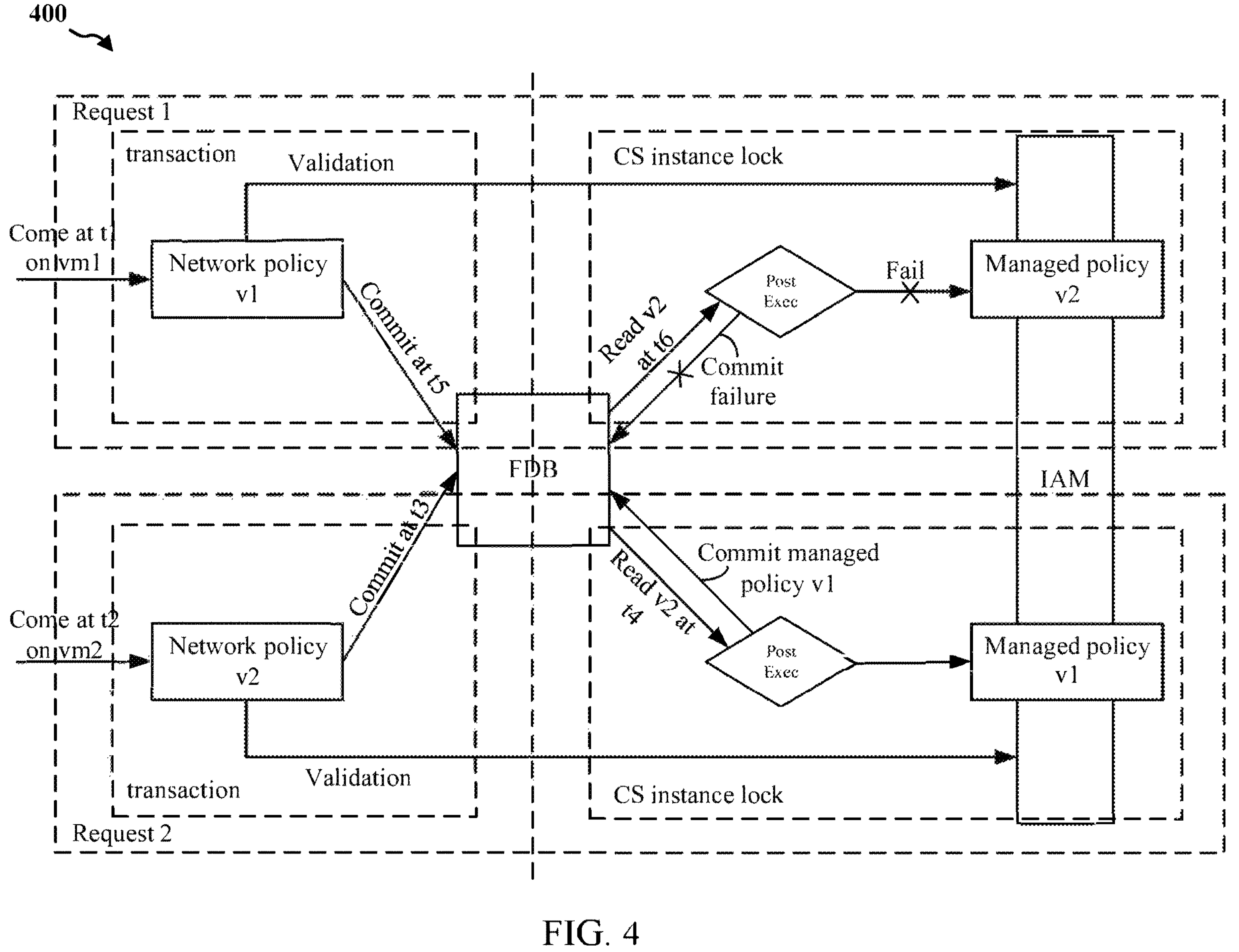
FIG. 4 is a block diagram that illustrates examples of requests to create an IAM in accordance with some aspects of the present disclosure.

In some aspects, an analysis of use cases may be used to determine whether operations are properly functioning, as shown for example in diagram 400 of FIG. 4. In an example, a managed policy creation/update/delete managed policy may be triggered, which may cause a IAM policy successfully created, and which may result in new versions being committed to the DPO. In another example, an IAM request is not successful and responds with an error code, and based on the error code, a retry request may occur with the correct API or the request may be ignored. In another example, the IAM policy status may be unknown and the client may timeout such that a failure occurs. In another example, everything works well on IAM but an error occurs at the CS (e.g., CS crashes), and results in an inconsistent state such that a periodic consistency fix occurs. In yet another example, the CS may fail before sending the request to the IAM, such that the request fails. In yet another example, a CS instance lock occurs so that one managed policy operation occurs at a time for a given network policy. In such instances, token generation does not support passing managed policy versions. When a new IAM policy version is created under the same resource number, it sets the latest version as default. Supporting two requests may alter the same network policy with different values, and two parallel IAM requests create two versions, but the second version may return earlier than the first version and FDB can commit a value from the first version to the network policy, while IAM uses the second version as the default version. In some aspects, such as when there are parallel requests attaching the same network policy to different users or account, the locking of the operation can avoid creating versions with the same policy document.

In some aspects, a thread pool may be utilized in instances of asynchronous events (e.g., asynchronous flow). In such instances, a set account level network policy may unset an existing attached network policy, and the potential unset policy may be identified and delete the mapped managed policies. This can be done asynchronously to unblock the set parameter flow. The set parameter flow for the unset network policy may not be used while the data plane is fetching the network policy stage. The set parameter flow remains in IAM for a period of time from the parameter unset operation. In some aspects, a set user level network policy does not have this problem because it is triggered from a function (e.g., ExecAlterUserNew) where the old policy is available. The mapped managed policies are updated/fixed in the synchronous flow. In some aspects, a system function used to fix inconsistencies may be synchronous to ensure that inconsistencies are fixed.

In some aspects, the replication of network policy DPOs does not trigger SQL requests, fixing inconsistencies in managed policies may be triggered after completion of the network rule mapping replication. The triggering of fixing inconsistencies in the managed policies may be synchronous, because even though the replication process itself is periodic and may not be real time, it is desirable to have a consistent experience such that once the network policy is replicated, the network policy should take effect in the same operation.

Figure 5:
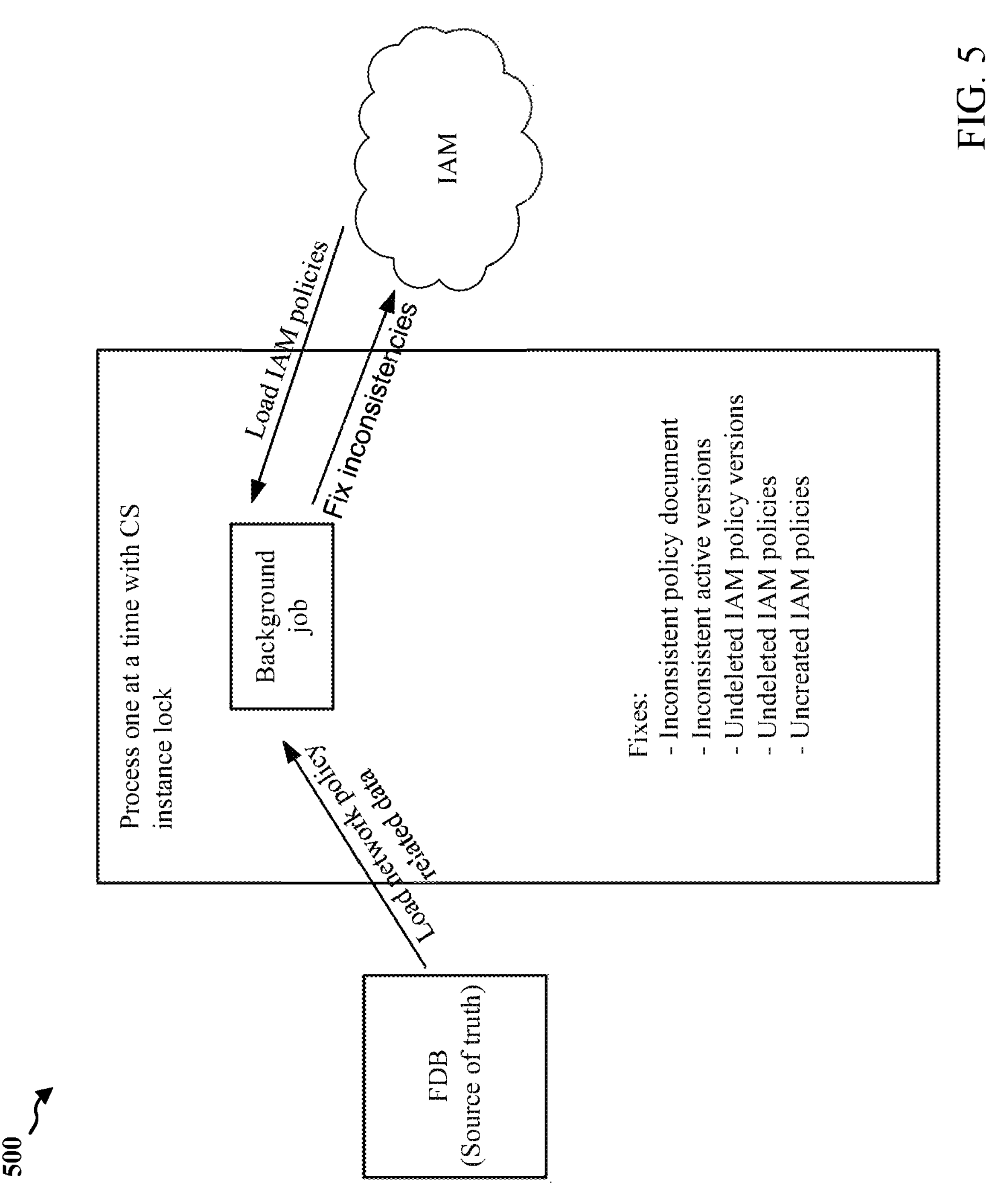
FIG. 5 is a block diagram that illustrates an example of filtering inconsistencies in accordance with some aspects of the present disclosure.

In some aspects, fixing consistencies may occur periodically, as shown for example in diagram 500 of FIG. 5. For example, a synchronization of policy data may occur between a user and the service, such that inconsistencies may exist due to failures. A regular flow of fixing inconsistency per customer account may be based on at least a listing of policies based on a path prefix to retrieve all managed policy under a customer, or fetch all attached network policies of a customer account, where DPO fields (e.g., managedPolicyVersion, managedPolicyCount) may be used as source of truth to fix inconsistency, such that unused or zombie managed policies are deleted, which can be either smaller or larger versions, and redundant managed policies. For example, the FDB may act as the source of truth and may load network policy related data, and the IAM may load IAM policies, which may result in the fixing of inconsistencies at the IAM. Some of the inconsistencies that may be updated or fixed include, but are not limited to, inconsistent policy data, inconsistent active versions, undeleted IAM policy version, undeleted IAM policies, or uncreated IAM policies.

In some aspects, a data path change is relatively simpler, for example, in instances where managed policy is enforced and the active network policy has mapped managed policies, then we use the following logic may be used. For example, a logic that may be used includes adding a managed policy resource number field (e.g., managedPolicyArns) in network policy (e.g., AwsAccessCredsNetworkPolicy). A list of resource numbers may be constructed from the current active policy DPO fields (e.g., mangedPolicyCount). In some aspects, virtual private cloud IDs may be kept to related network constraints in existing inline session policies, such that no change to the inline policy restricting the action and resource based on the storage use cases; or convert the allowed inline policies restricting the action and resource based on the storage use cases to a deny statement.

FIG. 6 is a block diagram 600 that illustrates the computing device 102 in accordance with some aspects of the present disclosure. The computing device 102 includes a memory 104 and a processing device 106. The processing device 106 is operatively coupled to the memory 104.

The processing device 106 is to generate and activate, at a computing device 102, a set of network policies 602 on a control plane of a service provider 610. The processing device 106 is to determine to convert 604 the set of network policies activated on the control plane of the service provider into an IAM policy at the service provider. The processing device 106 is to utilize at least one of the converted IAM policies of an active network policy in response to a creation of a presigned URL 606. The processing device 106 is to determine whether a STS 608 token is approved based on the presigned URL and at least one of the set of network policies or the IAM policy. The processing device 106 is to utilize an approved STS token to access the service provider.

In some aspects, the processing device to determine to convert the set of network policies the processing device may compare a size of the set of network policies to a size threshold. In some aspects, the set of network policies may be converted to the IAM policy in response to the size of the set of network policies being greater than the size threshold. Information related to the converted IAM managed policies may be stored within a metadata of the network policy, where the metadata includes a reference to the set of network policies. In some aspects, the set of network policies is not converted to the IAM policy in response to the size of the set of network policies being less than the size threshold. References of the converted IAM managed policies from the active network policy may be included within a session policy.

Figure 7:
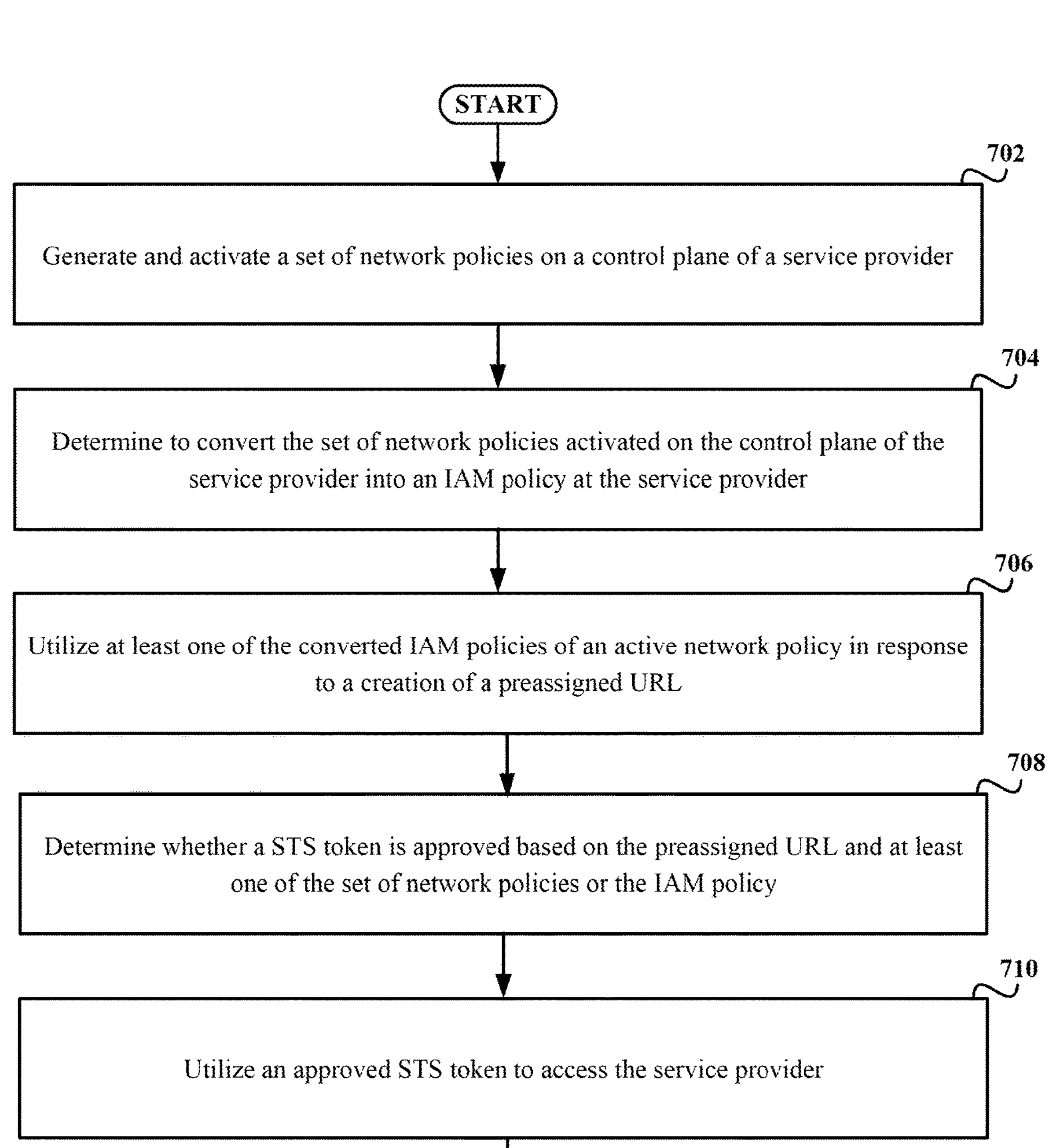
FIG. 7 is a flow diagram of a method for configuring managed policy for internal stage network policy in accordance with some aspects of the present disclosure.

FIG. 7 is a flow diagram of a method 700 for configuring managed policy for internal stage network policy in accordance with some aspects of the present disclosure. The method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some aspects, the method 700 may be performed by a computing device (e.g., computing device 102 in FIG. 1, 2, or 6).

At block 702, a computing device (of a device), generates and activates a set of network policies on a control plane of a service provider. In an example, the device may be the computing device 102. In an example, the set of network policies may be network policies 110 of FIG. 1 or 2. In an example, the control plane of the service provider may be service provider 610 of FIG. 6.

At block 704, the computing device, determines to convert the set of network policies activated on the control plane of the service provider into an IAM policy at the service provider. In an example, the IAM policy may be policy 204 of FIG. 2 or conversion 604 of FIG. 6.

At block 706, the computing device, utilizes at least one of the converted IAM policies of an active network policy in response to a creation of a presigned URL. In an example, the presigned URL may be presigned URL 606 of FIG. 6.

At block 708, the computing device, determines whether a STS token is approved based on the presigned URL and at least one of the set of network policies or the IAM policy. In an example, the STS token may be STS 118 of FIG. 2 or STS 608 of FIG. 6.

At block 710, the computing device, utilizes an approved STS token to access the service provider.

In some aspects, to determine to convert the set of network policies, the computing device, compares a size of the set of network policies to a size threshold. In some aspects, the set of network policies is not converted to the IAM policy in response to the size of the set of network policies being less than the size threshold. References of the converted IAM managed policies from the active network policy may be included within a session policy. In some aspects, the set of network policies is converted to the IAM policy in response to the size of the set of network policies being greater than the size threshold. Information related to the converted IAM managed policies may be stored within a metadata of the network policy, wherein the metadata includes a reference to the set of network policies.

Figure 8:
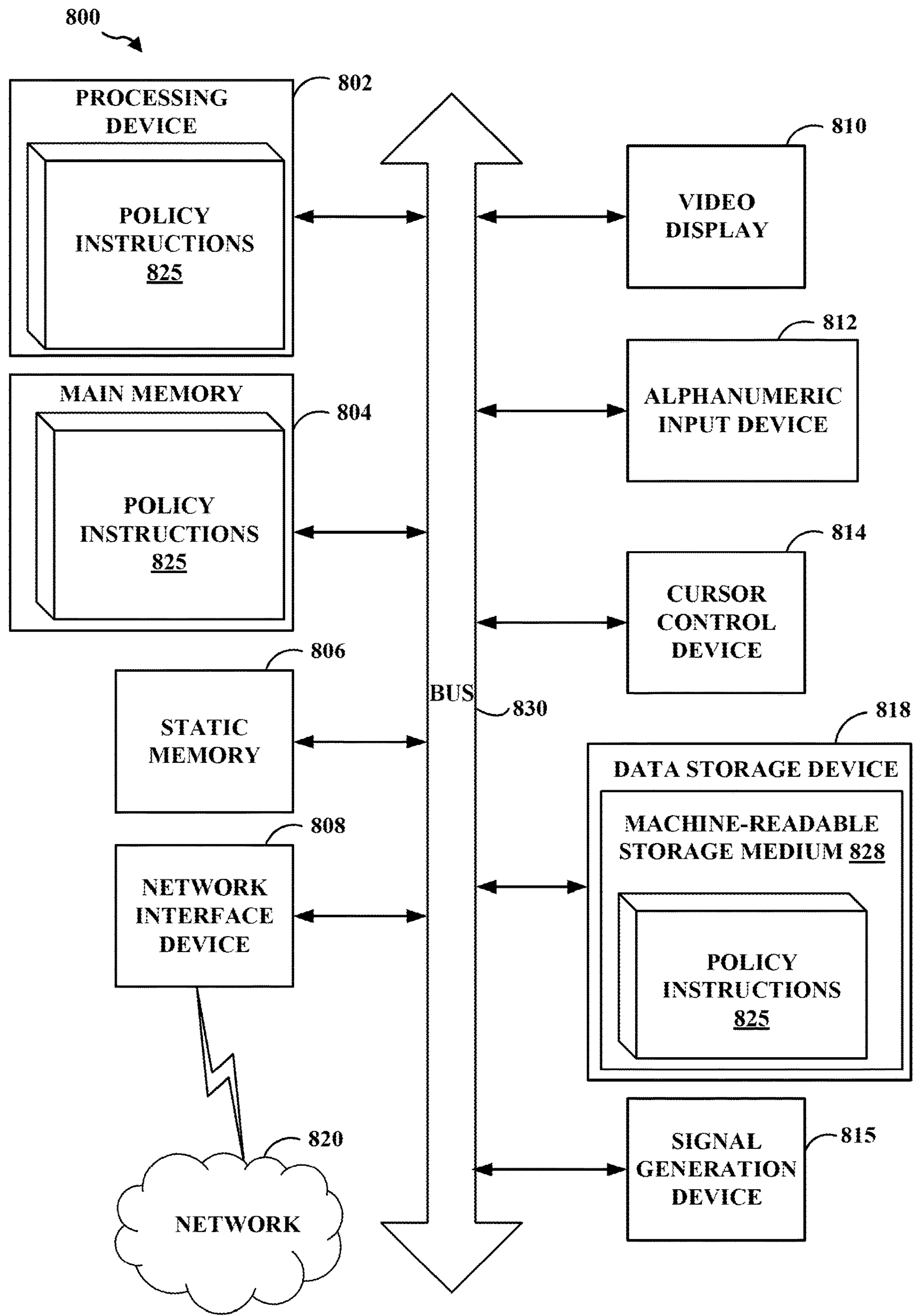
FIG. 8 is a block diagram of an example of a computer system that may perform one or more of the operations described herein in accordance with some aspects of the present disclosure.

FIG. 8 illustrates a diagrammatic representation of a machine in the example form of a computer system 800 within which a set of instructions, for causing the machine to perform any one or more of the methodologies discussed herein for configuring managed policy for internal stage network policy. More specifically, the machine may generate and activate a set of network policies on a control plane of a service provider; determine to convert the set of network policies generated on the control plane of the service provider into an IAM policy at the service provider; utilize at least one of the converted IAM policies of an active network policy in response to a creation of a presigned URL; determine whether a STS token is approved based on the presigned URL and at least one of the set of network policies or the IAM policy; and utilize an approved STS token to access the service provider.

In alternative aspects, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or a bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one aspect, the computer system 800 may be representative of a server.

The computer system 800 includes a processing device 802, a main memory 804 (e.g., read-only memory (ROM), flash memory, dynamic random access memory (DRAM), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

The computer system 800 may further include a network interface device 808 which may communicate with a network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 815 (e.g., a speaker). In one example, the video display unit 810, the alphanumeric input device 812, and the cursor control device 814 may be combined into a single component or device (e.g., an LCD touch screen).

The processing device 802 represents one or more general-purpose processing devices such as a microprocessor, a central processing unit, or the like. More particularly, the processing device 802 may be a complex instruction set computing (CISC) microprocessor, a reduced instruction set computer (RISC) microprocessor, a very long instruction word (VLIW) microprocessor, or a processor implementing other instruction sets, or processors implementing a combination of instruction sets. The processing device 802 may also be one or more special-purpose processing devices such as an application specific integrated circuit (ASIC), a field programmable gate array (FPGA), a digital signal processor (DSP), a network processor, or the like. The processing device 802 is configured with policy instructions 825, for performing the operations and steps discussed herein. For example, the policy instructions 825 may include instructions for configuring managed policy for internal stage network policy.

The data storage device 818 may include a machine-readable storage medium 828 storing policy instructions 825 (e.g., software) embodying any one or more of the methodologies of functions described herein. The policy instructions 825 may also reside, completely or partially, within the main memory 804 or within the processing device 802 during execution thereof by the computer system 800; the main memory 804 and the processing device 802 also constituting machine-readable storage media. The policy instructions 825 may further be transmitted or received over the network 820 via the network interface device 808.

The machine-readable storage medium 828 may also be used to store the policy instructions 825 to perform a method for configuring managed policy for internal stage network policy, as described herein. While the machine-readable storage medium 828 is shown in an exemplary aspect to be a single medium, the term "machine-readable storage medium" should be taken to include a single medium or multiple media (e.g., a centralized or distributed database, or associated caches and servers) that store the one or more sets of instructions. A machine-readable storage medium includes any mechanism for storing information in a form (e.g., software, processing application) readable by a machine (e.g., a computer). The machine-readable storage medium may include, but is not limited to, a magnetic storage medium (e.g., floppy diskette), an optical storage medium (e.g., CD-ROM), a magneto-optical storage medium, a read-only memory (ROM), random-access memory (RAM), erasable programmable memory (e.g., EPROM and EEPROM), flash memory, or another type of medium suitable for storing electronic instructions.

The preceding description sets forth numerous specific details such as examples of specific systems, components, methods, and so forth, in order to provide a good understanding of several aspects of the present disclosure. It will be apparent to one skilled in the art, however, that at least some aspects of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular aspects may vary from these exemplary details and still be contemplated to be within the scope of the present disclosure.

Additionally, some aspects may be practiced in distributed computing environments where the machine-readable medium is stored on and or executed by more than one computer system. In addition, the information transferred between computer systems may either be pulled or pushed across the communication medium connecting the computer systems.

Aspects of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another aspect, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" or "an implementation" or "one implementation" throughout is not intended to mean the same aspect or implementation unless described as such. Furthermore, the terms "first," "second," "third," "fourth," etc. as used herein are meant as labels to distinguish among different elements and may not necessarily have an ordinal meaning according to their numerical designation. Unless specifically stated otherwise, terms such as "generating," "activating," "determining," "utilizing," "comparing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass aspects in hardware, software, or a combination thereof.

What is claimed is:

1. A system, comprising:

a memory; and a processing device, operatively coupled to the memory, to:

generate and activate a network policy on a control plane of a service provider;

compare a size of the network policy to a size threshold to determine whether to convert the network policy into identity and access management (IAM) policies at the service provider;

in response to the size of the network policy being greater than the size threshold, converting the network policy into one or more IAM policies;

utilize at least one of the one or more IAM policies in response to a creation of a presigned uniform resource locator (URL);

determine whether a security token service (STS) token is approved based on the presigned URL and at least one of the network policy or the one or more IAM policies; and utilize an approved STS token to access the service provider.

2. The system of claim 1, wherein each of the one or more IAM policies are mapped to the network policy, and wherein the STS token comprises a reference to the network policy or at least one of the one or more IAM policies.

3. The system of claim 1, wherein the network policy is not converted to the one or more IAM policies in response to the size of the network policy being less than the size threshold.

4. The system of claim 3, wherein references of the one or more IAM policies are included within a session policy.

5. The system of claim 1, wherein information related to the one or more IAM policies are stored within a metadata of the network policy.

6. A method, comprising:

generating and activating a network policy on a control plane of a service provider;

comparing a size of the network policy to a size threshold to determine whether to convert the network policy into identity and access management (IAM) policies at the service provider;

in response to the size of the network policy being greater than the size threshold, converting the network policy into one or more IAM policies;

utilizing at least one of the one or more IAM policies in response to a creation of a presigned uniform resource locator (URL);

determining whether a security token service (STS) token is approved based on the presigned URL and at least one of the network policy or the one or more IAM policies; and utilizing an approved STS token to access the service provider.

7. The method of claim 6, wherein each of the one or more IAM policies are mapped to the network policy, and wherein the STS token comprises a reference to the network policy or at least one of the one or more IAM policies.

8. The method of claim 6, wherein the network policy is not converted to the one or more IAM policies in response to the size of the network policy being less than the size threshold.

9. The method of claim 8, wherein references of the one or more IAM policies are included within a session policy.

10. The method of claim 6, wherein information related to the one or more IAM policies are stored within a metadata of the network policy.

11. A non-transitory computer-readable storage medium including instructions that, when executed by a processing device, cause the processing device to:

generate and activate a network policy on a control plane of a service provider;

compare a size of the network policy to a size threshold to determine whether to convert the network policy into identity and access management (IAM) policies at the service provider;

in response to the size of the network policy being greater than the size threshold, converting the network policy into one or more IAM policies, utilize at least one of the one or more IAM policies in response to a creation of a presigned uniform resource locator (URL);

determine whether a security token service (STS) token is approved based on the presigned URL and at least one of the network policy or the one or more IAM policies; and utilize an approved STS token to access the service provider.

12. The non-transitory computer-readable storage medium of claim 11, wherein each of the one or more IAM policies are mapped to the network policy, and wherein the STS token comprises a reference to the network policy or at least one of the one or more IAM policies.

13. The non-transitory computer-readable storage medium of claim 11, wherein the network policy is not converted to the one or more IAM policies in response to the size of the network policy being less than the size threshold.

14. The non-transitory computer-readable storage medium of claim 13, wherein references of the one or more IAM policies are included within a session policy.

* * * * *